(12) United States Patent
Nakazeki et al.

(10) Patent No.: US 6,431,757 B1
(45) Date of Patent: Aug. 13, 2002

(54) HYDRODYNAMIC TYPE BEARING UNIT

(75) Inventors: Tsugito Nakazeki; Kazuo Okamura, both of Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/696,669

(22) Filed: Oct. 26, 2000

(30) Foreign Application Priority Data

Oct. 28, 1999 (JP) ............................................. 11-307249

(51) Int. Cl.$^7$ ................................................. F16C 32/06
(52) U.S. Cl. ....................................................... 384/107
(58) Field of Search .............................. 384/100, 107, 384/112

(56) References Cited

U.S. PATENT DOCUMENTS 5,357,162 A * 10/1994 Aiyoshizawa et al. ...... 384/112
5,707,154 A * 1/1998 Ichiyama ..................... 384/107
6,040,648 A * 3/2000 Kawawada et al. ......... 384/107
6,059,459 A * 5/2000 Ichiyama ..................... 384/112

* cited by examiner

Primary Examiner—Thomas R. Hannon
(74) Attorney, Agent, or Firm—Arent Fox Kintner Plotkin & Kahn, PLLC

(57) ABSTRACT

A hydrodynamic type bearing unit with enhanced moment load capacity. In the bearing unit, a radial bearing clearance and thrust bearing clearances are set at such widths that a tilted spindle member comes into contact at the outer periphery of its spindle with both axial ends of a radial bearing surface opposed thereto, as well as at the rims of both end faces of its flange portion with respective thrust bearing surfaces opposed thereto, so that the moment load can by supported by both the radial bearing part and the thrust bearing part. Specifically, the radial bearing clearance $\delta_R$ and the thrust bearing clearances $\delta_A$ are set in accordance with the expression $D\delta_R/L + \epsilon \geq \delta_A \geq D\delta_R/L$ (where D is the diameter of the flange portion, L is the axial length of the radial bearing part, and $\epsilon$ is a machining error).

5 Claims, 3 Drawing Sheets

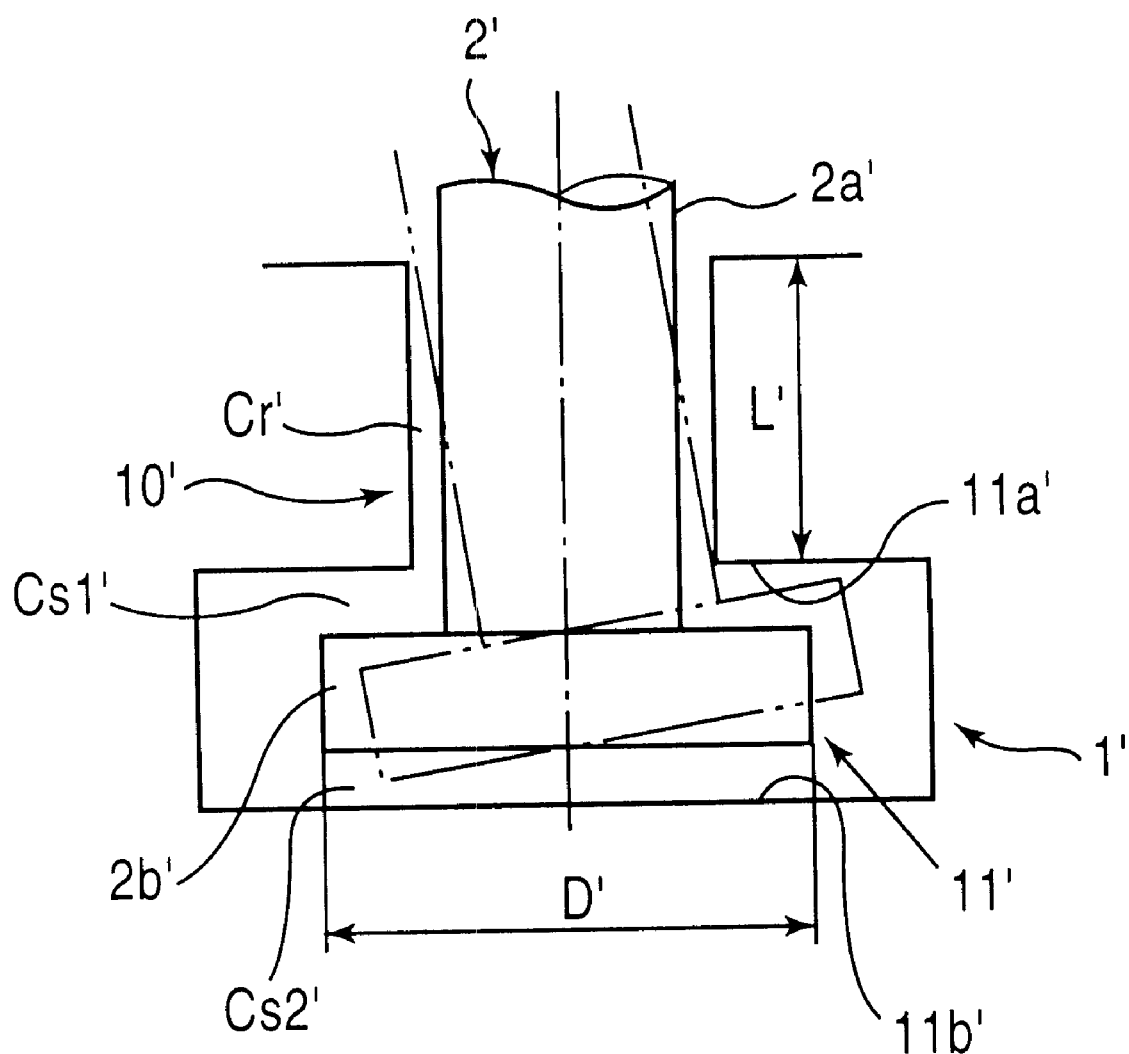

HYDRODYNAMIC TYPE BEARING UNIT

BACKGROUND OF THE INVENTION

1. Field of the Invention

The present invention relates to a hydrodynamic type bearing unit. This bearing unit is particularly suited to supporting a spindle of a spindle motor for use in information equipment including magnetic disk drives such as an HDD and an FDD, optical disk drives such as a CD-ROM and a DVD-ROM, and magneto-optical disks such as an MD and an MO, or a spindle of a polygon scanner motor for use in laser beam printers (LBPs).

2. Description of the Related Art

A spindle motor in various information equipment mentioned above requires high rotational accuracy, along with higher speeds, lower costs, lower noises, and the like. Among the components that determine these performance requirements is a bearing for supporting the spindle of that motor. For this type of bearing, a hydrodynamic type bearing having excellent properties as to the above-mentioned performance requirements has been recently studied for its use, or put into practical use.

For example, some hard disk drives (HDD), a kind of information equipment, include a bearing unit in which, as schematically shown in FIG. 5, both a radial bearing part 10' for supporting a spindle member 2' in the radial direction and a thrust bearing part 11' for supporting the spindle member 2' in the thrust direction are constituted by hydrodynamic type bearings. In this shown example, the spindle member 2' consists of a spindle 2a' and a thrust disc 2b' fixed to an end of the spindle 2a'. The rotation of the spindle member 2' creates other hydrodynamic pressures of oil, air, or the like in a bearing clearance Cr' of the radial bearing part 10' and in bearing clearances CS1' and CS2' of the thrust bearing part 11', whereby the spindle member 2' is rotatably supported in both the radial and thrust directions without contact.

Recently, in contemplation of on-notebook-PC mounting and the like, there has been a growing demand that the above-described bearing unit 1' have more compact configuration, in particular a reduced axial dimension (lower profile). As a measure to be taken therefor, the radial bearing part 10' may be effectively reduced in axial length L'. The reduction of the axial length L', however, is accompanied by a decrease of the radial bearing part 10' in bearing span (distance between axially-spaced hydrodynamic type bearings), producing a problem of lower bearing capacity against a moment load.

In particular, the thrust disc 2b' and the spindle 2a' conventionally involve forming errors in the perpendicularity therebetween and the like. To prevent the thrust disc 2b' and the thrust bearing surfaces 11a', 11b' from contacting each other because of these errors, the thrust bearing clearances CS1' and CS2' are formed fairly large. When the spindle member 2' here is tilted by a moment load (as shown by double-dashed chain lines in FIG. 5), however, most of the moment load is supported by the radial bearing part 10' (the top end thereof, in particular) while the thrust bearing part 11' exerts little moment supporting power. This decreases the moment load capacity of the entire bearing unit.

Moreover, when the bearing unit 1' is made thinner as described above, the diameter D' of the thrust disc 2b' becomes greater in relation to the axial length L' of the radial bearing part 10'. The moment load capacity of the entire bearing unit thus depends largely on the moment load capacity of the thrust bearing part 11'. On the contrary, the conventional thrust bearing part 11' cannot provide a sufficient moment supporting power, and this has been a major obstacle to increase moment load capacity.

SUMMARY OF THE INVENTION

In view of the foregoing, an object of the present invention is to enhance the moment supporting power, in particular, of the thrust bearing part, and improve the moment load capacity of the entire hydrodynamic type bearing unit.

To achieve the foregoing object, a hydrodynamic type bearing unit according to the present invention comprises: a spindle member composed of a spindle and a flange portion; a radial bearing part for supporting the spindle member in a radial direction without contact by means of a hydrodynamic pressure occurring in a radial bearing clearance between the outer periphery of the spindle and a radial bearing surface opposed thereto; and a thrust bearing part for supporting the spindle member in a thrust direction without contact by means of hydrodynamic pressures occurring in thrust bearing clearances between the end faces of the flange portion and thrust bearing surfaces opposed thereto, wherein a relation between the radial bearing clearance and the thrust bearing clearances are set so that a moment load acting on the spindle member is supported by both of the radial bearing part and the thrust bearing part. Here, the spindle member tilted comes into contact at the outer periphery of its spindle with both axial ends of the radial bearing surface opposed thereto. In the meantime, the rims of both end faces of its flange portion also come into contact with the respective thrust bearing surfaces opposed thereto.

When the radial bearing clearance $\delta_R$ and the thrust bearing clearance $\delta_A$ satisfy the following expression:

$$(D\delta_R/L)+\epsilon \geq \delta_A \geq D\delta_R/L$$

(where D is the diameter of the flange portion, L is the axial length L of the radial bearing part, and $\epsilon$ is a machining error), both the radial bearing part and the thrust bearing part can secure a practically sufficient moment supporting power.

Here, the machining error $\epsilon$ may be 4 μm. The diameter D of the flange portion may be equal to or smaller than 10 mm.

In any of the configurations described above, the diameter of the flange portion is preferably greater than the axial length of the radial bearing part.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a sectional view showing the general configuration of a conventional hydrodynamic type bearing unit.

DETAILED DESCRIPTION OF THE PREFERRED EMBODIMENTS

Hereinafter, an embodiment of the present invention will be described with reference to FIGS. 1 through 4(B).

Figure 3:
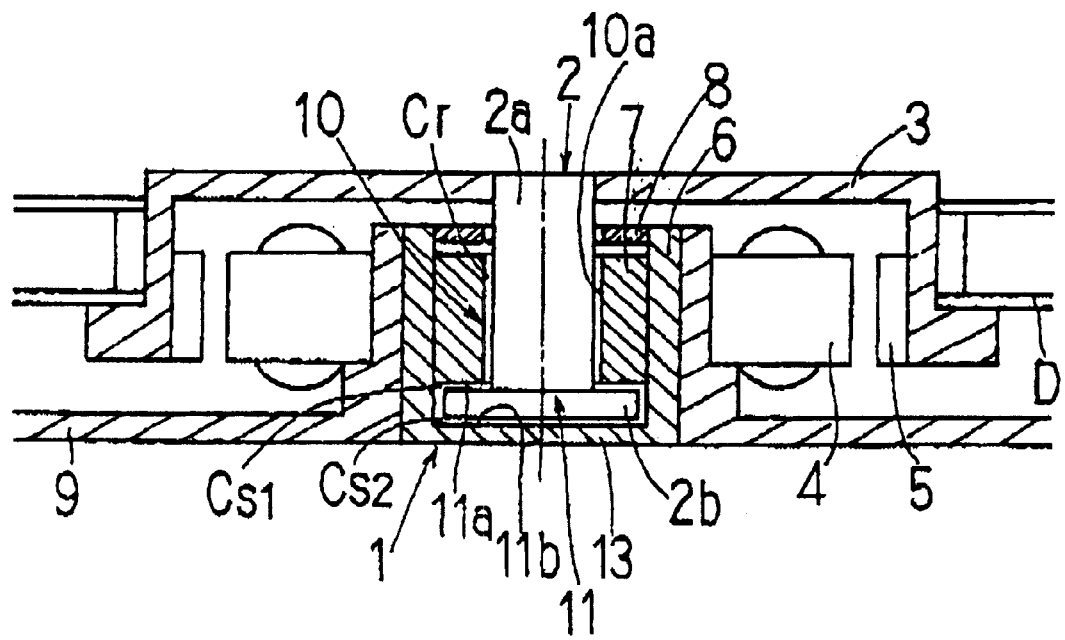
FIG. 3 is a sectional view of a spindle motor having a hydrodynamic type bearing unit.

FIG. 3 is a sectional view of a spindle motor for information equipment, having a hydrodynamic type bearing unit 1 according to the present invention. In FIG. 3, an HDD (hard disk drive) spindle motor is shown as an example. This spindle motor comprises: the bearing unit 1 supporting a spindle member 2 rotatably; a disk hub 3 attached to the spindle member 2 to hold one or a plurality of magnetic disks D; and a motor stator 4 and a motor rotor 5 opposed to each other across a radial gap. The stator 4 is mounted on the cylindrical periphery of a casing 9 for holding the bearing unit 1. The rotor 5 is attached to the inner periphery of the disk hub 3. When the stator 4 is energized, an excitation force between the stator 4 and the rotor 5 rotates the rotor 5 to rotate the disk hub 3 and the spindle member 2.

The bearing unit 1 is chiefly composed of: the spindle member 2; a closed-bottomed cylindrical, or so-called bag-type housing 6; a thick cylindrical bearing member 7 fixed to the inner periphery of the housing 6; and a seal member 8 such as a seal washer, for sealing the bearing member 7 at one side (the opening side of the housing 6). The spindle member 2 consists of a spindle 2a and a thrust disc 2b (flange portion) projected radially outward at the end of the spindle 2a. This spindle member 2 is arranged so that its spindle 2a and flange portion 2b are accommodated in the bore of the bearing member 7 and in between the bearing member 7 and the bottom of the housing 6, respectively.

The bearing member 7 is made of, for example, a soft metal such as copper and brass, or sintered metal. On the inner periphery of the bearing member 7 is formed a radial bearing surface 10a having one or a plurality (two, in the present embodiment) of hydrodynamic pressure generating portions. Accordingly, when the spindle member 2 and the bearing member 7 are making relative rotations (when the spindle member 2 is rotated, in the present embodiment), a hydrodynamic pressure occurs in a radial clearance Cr between the radial bearing surface 10a and the outer periphery of the spindle 2a. This constitutes a radial bearing part 10 for supporting the spindle 2a in the radial direction without contact. Incidentally, the radial bearing clearance Cr shown in the diagram is exaggerated in width (ditto for the thrust bearing clearances Cs1 and Cs2 to be described later).

When the bearing member 7 is formed of a sintered metal, hydrodynamic pressure generating grooves therein can be formed at low costs and with high precision by compression forming. More specifically, in the compression forming, a groove die having projections and depressions corresponding to the configuration of the hydrodynamic pressure generating grooves (see FIG. 4(A)) in the radial bearing surface 10a is formed on the outer periphery of a core rod. Then, sintered metal is supplied to around the core rod, and the sintered metal is compressed so that the hydrodynamic pressure generating grooves corresponding to the groove die configuration are transferred to the inner periphery of the sintered metal. Here, the sintered metal can be easily released from the die by removing the compressing force to utilize the spring back of the sintered metal. Such use of a sintered metal as the material of the bearing member 7 allows the bearing unit 1 to be used as a hydrodynamic type oil-impregnated bearing with the bearing member 7 impregnated with lubricating oil or lubricating grease.

On both axial sides of the flange portion 2b are provided axial clearances, or thrust bearing clearances Cs1 and Cs2. The thrust bearing clearance Cs1 is formed between the upper end face of the flange portion 2b and an opposed end face of the bearing member 7. The other thrust bearing clearance Cs2 is formed between the lower end surface of the flange portion 2b and the opposed surface of a thrust supporting portion 13. The present embodiment deals with an example where the thrust supporting portion 13, constituting the bottom that closes the other opening of the housing 6, is formed integrally on the housing 6. However, the thrust supporting portion 13 may be formed independent of the housing 6. The lower end face of the bearing member 7, opposed to the thrust bearing clearance Cs1, and the top surface of the thrust supporting portion 13, opposed to the other thrust bearing Cs2, are formed into thrust bearing surfaces 11a and 11b having hydrodynamic pressure generating grooves, respectively. In the rotations mentioned above, a hydrodynamic pressure thus occurs in the thrust bearing clearances Cs1 and Cs2 to form a thrust bearing part 11 for supporting the flange portion 2b in both thrust directions without contact.

Figure 4A:
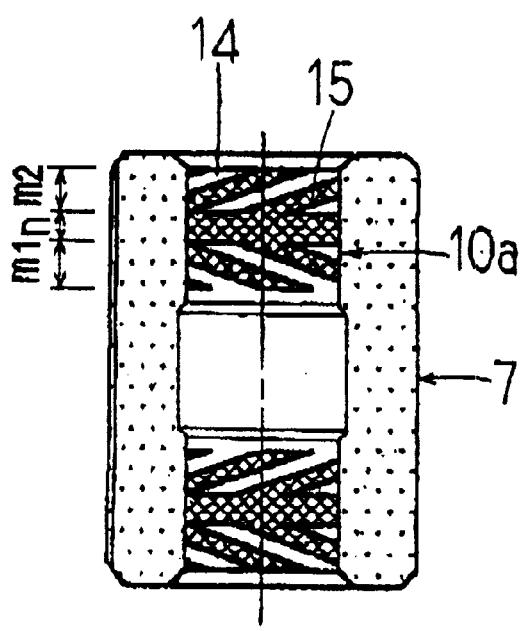
FIG. 4(A) is a sectional view of a bearing member.
Figure 4B:
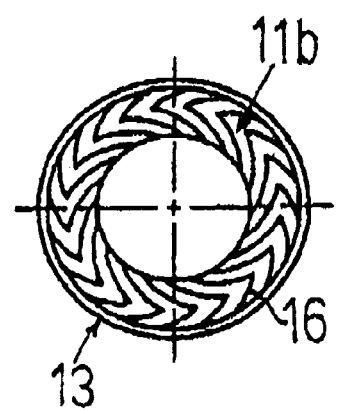
FIG. 4(B) is a plan view of a thrust bearing part.

The configurations of the hydrodynamic pressure generating grooves in the above-described radial bearing surface 10a and thrust bearing surfaces 11a, 11b may be selected arbitrarily. Any configuration may be selected for use from among those known publicly including herringbone type, spiral type, step type, and multiorb type. These configurations may also be appropriately combined with each other. FIGS. 4(A) and 4(B) show hydrodynamic pressure generating grooves of herringbone type as an example. Here, FIG. 4(A) shows the radial bearing surface 10a, and FIG. 4(B) the thrust bearing surface 11b on the thrust supporting portion 13. As shown in the diagrams, the radial bearing surface 10a have two hydrodynamic pressure generating portions each including: a first groove region m1 provided with hydrodynamic pressure generating grooves 14 slanting in one direction; a second groove region m2 axially spaced from the first region m1, provided with hydrodynamic pressure generating grooves 14 slating in the other direction; and an annular region n located between the two groove regions m1 and m2. In each of the hydrodynamic pressure generating portions, ridges 15 between the hydrodynamic pressure generating grooves 14 are on the same level with region n. Hydrodynamic pressure generating grooves 16 in the thrust bearing surface 11b are shaped like Vs having bends roughly at their radial centers.

The bearing unit 1 described above is assembled by inserting the spindle member 2 to the housing 6 with the flange portion 2b down, and pressing or adhesive bonding the bearing member 7 to a predetermined position on the inner periphery of the housing 6 so that the thrust bearing clearances Cs1 and Cs2 of predetermined widths (of the order of 10–20 μm) are created. Then, this bearing unit 1 is pressed into or adhesive bonded to the cylindrical inner periphery of the casing 9. Moreover, an assembly (motor rotor) including the rotor 5 and the disk hub 3 is pressed to the top end of the spindle 2a to fabricate the spindle motor shown in FIG. 1.

In the present invention, the radial bearing clearance Cr and the thrust bearing clearances Cs1, Cs2 are set so that a moment load can be supported by both the radial bearing part 10 and the thrust bearing part 11. More specifically, as schematically shown in FIGS. 1 and 2, the bearing clearances Cr, Cs1,Cs2 are set that the tilted spindle member 2 comes into contact at the outer periphery of its spindle 2a with both axial ends of the radial bearing surface 10a opposed thereto, simultaneously at the rims of both end faces of its flange portion 2b with the respective thrust bearing surfaces 11a and 11b opposed thereto.

Figure 1:
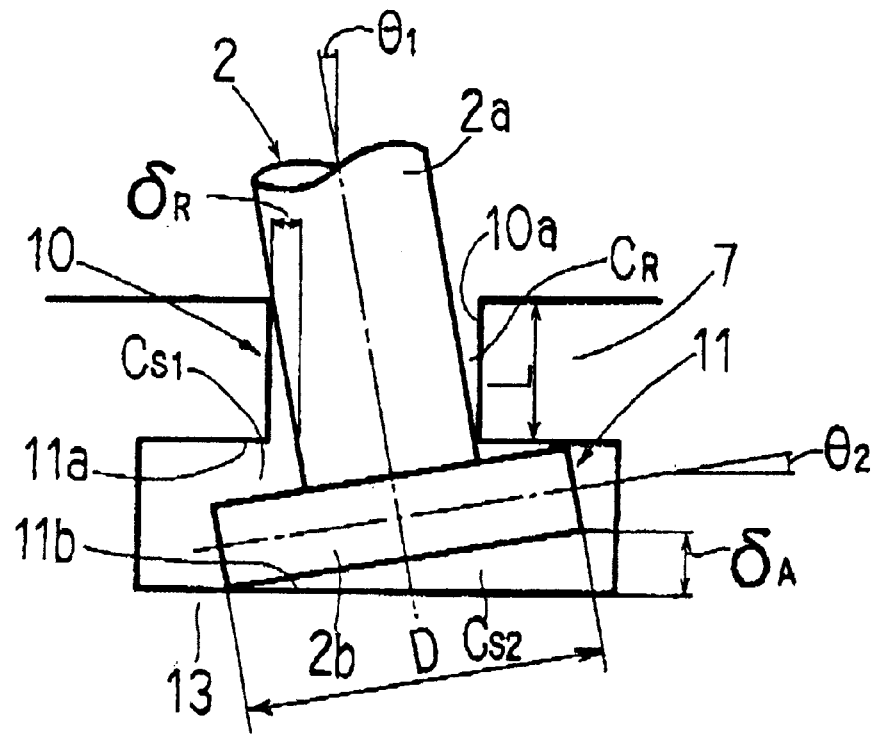
FIG. 1 is a sectional view showing the general configuration of a hydrodynamic type bearing unit according to the present invention.

FIG. 1 shows the case where no machining error is assumed. Here, a tiltable angle $\theta_1$ the spindle 2a can form in the radial bearing part 10 and a tiltable angle $\theta_2$ the flange portion 2b can form in the thrust bearing part 11 are set equal to each other ($\theta_1=\theta_2$), so as to realize the above-described simultaneous contacts in the bearing parts 10 and 11. Since both $\theta_1$ and $\theta_2$ are minute, the thrust bearing clearances $\delta_A$ (the sum of the clearances Cs1 and Cs2) is given by $$\delta_A = D\delta_R/L \qquad (1),$$

where D is the diameter of the flange portion 2b, L is the axial length of the radial bearing part 10, and $\delta_R$ is equal to the radial bearing clearance Cr. If the bearing clearances Cr, Cs1/Cs2 are settled to satisfy this relationship, the radial bearing part 10 and the thrust bearing part 11 produce almost equal moment supporting powers even when the spindle member 2 is tilted by a moment load. This makes it possible to enhance the entire bearing unit 1 in moment load capacity as compared with the conventional unit (see FIG. 5) which supports a moment load with its radial bearing part 10 alone.

Figure 2:
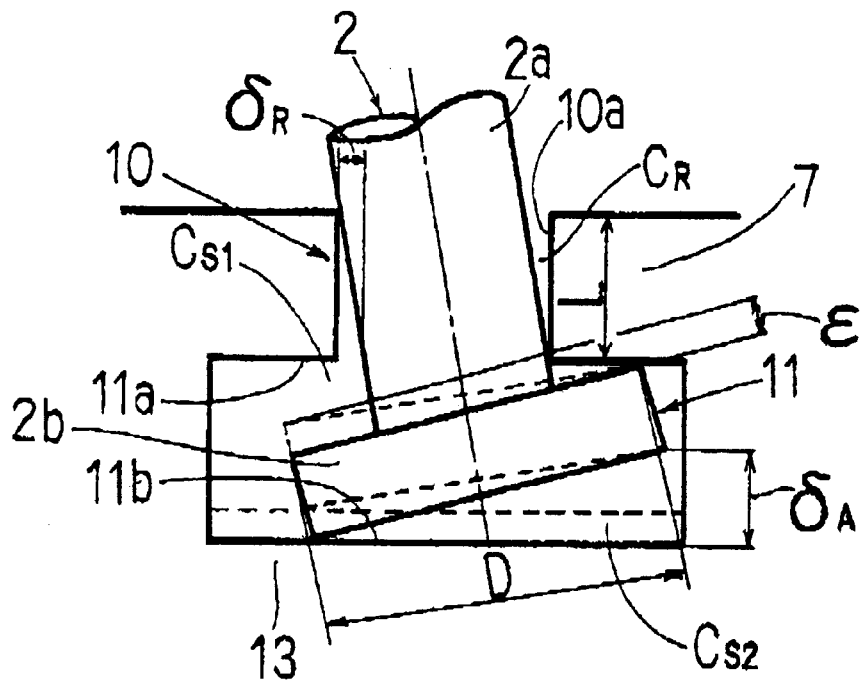
FIG. 2 is a sectional view showing the general configuration of a hydrodynamic type bearing unit according to the present invention.

FIG. 2 shows the case where a machining error $\epsilon$ is taken into account. In this case, the right side of the foregoing equation (1) added with an empirically-found machining error $\epsilon$ (under present circumstances, of the order of 4 $\mu$m) provides the sum $\delta_A$ of the thrust bearing clearances Cs1 and Cs2 ($\delta_A = D\delta_R/L + \epsilon \ldots$ (2)). The machining error $\epsilon$ employed herein involves an error in the perpendicularity between the spindle 2a and the flange portion 2b, and a decrease in the axial clearances due to an error in the parallelism between the thrust bearing surfaces 11a and 11b.

In fact, the machining error $\epsilon$ is uniquely determined within a certain distribution once the machining method is decided. According to the foregoing equations (1) and (2), $\delta_A$ can be set within the range of $(D\delta_R/L)+\epsilon \geq \delta_A \geq D\delta_R/L$ to secure almost equal moment supporting powers in the radial bearing part 10 and the thrust bearing part 11 for practically sufficient effects.

When the diameter D of the flange portion 2b is greater than the axial length L of the radial bearing part 10 (D>L), the moment load capacity of the entire bearing unit 1 becomes highly dependent on the moment supporting power of the thrust bearing part 11. In the present invention, the thrust bearing part 11 secures a sufficient moment supporting power, and thus allows a significant enhancement of the moment load capacity under such conditions. Here, the diameter D of the flange portion 2b is equal to or smaller than 10 mm.

Incidentally, FIGS. 1 and 2 have shown the flange portion 2b as is in contact with the bearing surfaces 10a and 11a/11b. The moment load capacity is, however, determined so that such contact can be prevented from occurring in actual bearing operations. Naturally, the hydrodynamic pressure generating grooves 14 and 16 are formed in configurations and depths appropriate to $\delta_R$ and $\delta_A$ of the radial bearing clearance Cr and the thrust bearing clearances Cs1, Cs2, determined under the conditions described above.

As has been described above, according to the present invention, a sufficient moment supporting power can be secured in the thrust bearing part as well as in the radial bearing part. This makes it possible to enhance the moment load capacity of the entire hydrodynamic type bearing unit, and thereby allows hydrodynamic type bearing units of still lower profiles.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A hydrodynamic bearing unit comprising:
   a spindle member composed of a spindle and a flange portion;
   a radial bearing part for supporting said spindle member in a radial direction without contact by means of a hydrodynamic pressure occurring in a radial bearing clearance between the outer periphery of said spindle and a radial bearing surface opposed thereto; and
   a thrust bearing part for supporting said spindle member in a thrust direction without contact by means of hydrodynamic pressures occurring in thrust bearing clearances between the end faces of said flange portion and thrust bearing surfaces opposed thereto, wherein
   a relation between said radial bearing clearance and said thrust bearing clearances are set so that a moment load acting on said spindle member is supported by both of said radial bearing part and said thrust bearing part.

2. The hydrodynamic bearing unit according to claim 1, wherein said radial bearing clearance $\delta_R$ and said thrust bearing clearances $\delta_A$ satisfy the following expression:

$$(D\delta_R/L)+\epsilon \geq \delta_A \geq D\delta_R/L,$$

where D is the diameter of said flange portion, L is the axial length of said radial bearing part, and $\epsilon$ is a machining error.

3. The hydrodynamic bearing unit according to claim 2, wherein the machining error $\epsilon$ is 4 $\mu$m.

4. The hydrodynamic bearing unit according to claim 3, wherein the diameter D of said flange portion is equal to or smaller than 10 mm.

5. The hydrodynamic bearing unit according to any one of claims 1–4, wherein the diameter of said flange portion is greater than the axial length of said radial bearing part.

* * * * *